H. LEMP.
HYDRAULIC STEERING CHECK FOR VEHICLES.
APPLICATION FILED MAR. 9, 1907.

927,735.

Patented July 13, 1909.
2 SHEETS—SHEET 1.

Witnesses:
Marcus L. Byng.
J. Ellis Glen

Inventor,
Hermann Lemp,
By Albert G. Davis
Att'y.

H. LEMP.
HYDRAULIC STEERING CHECK FOR VEHICLES.
APPLICATION FILED MAR. 9, 1907.

927,735.

Patented July 13, 1909.
2 SHEETS—SHEET 2.

Witnesses:
Marcus L. Byng.
J. Ellis Klein.

Inventor,
Hermann Lemp,
By Albert G. Davis,
Atty.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

HYDRAULIC STEERING-CHECK FOR VEHICLES.

No. 927,735.        Specification of Letters Patent.        Patented July 13, 1909.

Application filed March 9, 1907. Serial No. 361,448.

*To all whom it may concern:*

Be it known that I, HERMANN LEMP, a citizen of the United States, residing at Lynn, county of Essex, State of Massachusetts, have invented certain new and useful Improvements in Hydraulic Steering-Checks for Vehicles, of which the following is a specification.

This invention relates to motor vehicles, and its object is to provide a steering check for such vehicles which is adapted more particularly for heavy trucks, though capable of use with any type of automobile.

The invention consists, in brief, of a train of reducing gears interposed between the steering wheel and the guiding wheels of the vehicle, said gears or a portion of them being arranged to act as a rotary pump. The gear case is filled with a suitable liquid, such as a heavy lubricant, and a by-pass is provided from one side of the pump to the other, with a valve controlling the same and operated from a point near the steering wheel. When the valve is open, the gears can be readily turned to effect the steering of the vehicle, but as soon as the valve is closed they are locked by the lubricant or other liquid, since its passage from one side of the gears to the other is blocked.

Figure 1:
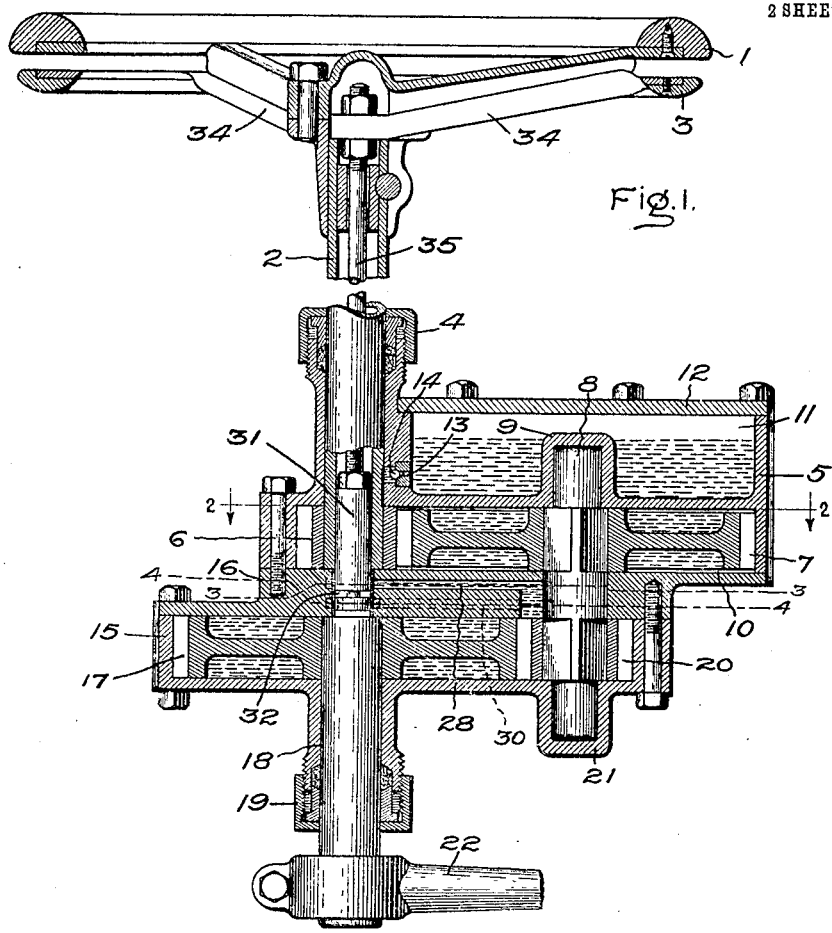
Figure 2:
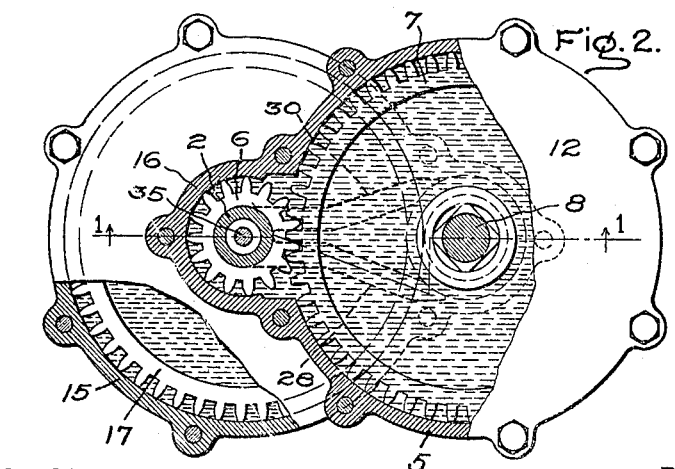
Figure 3:
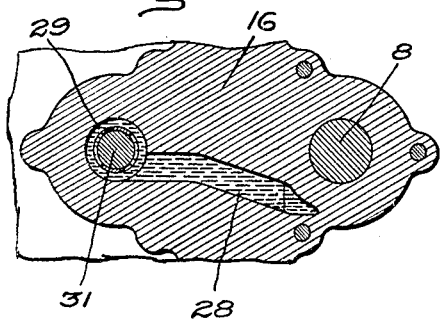
Figure 4:
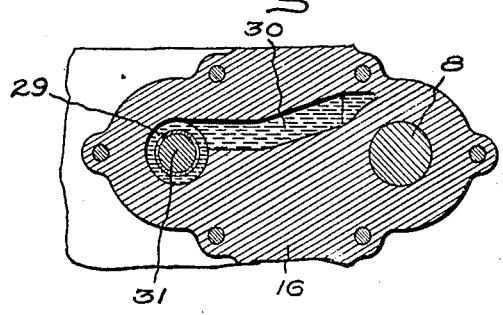
Figure 5:
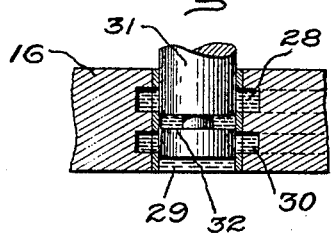
Figures 6, 7:
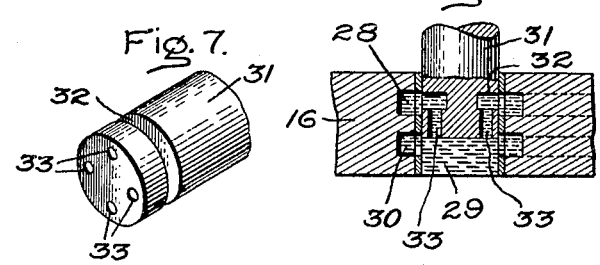
Figure 8:
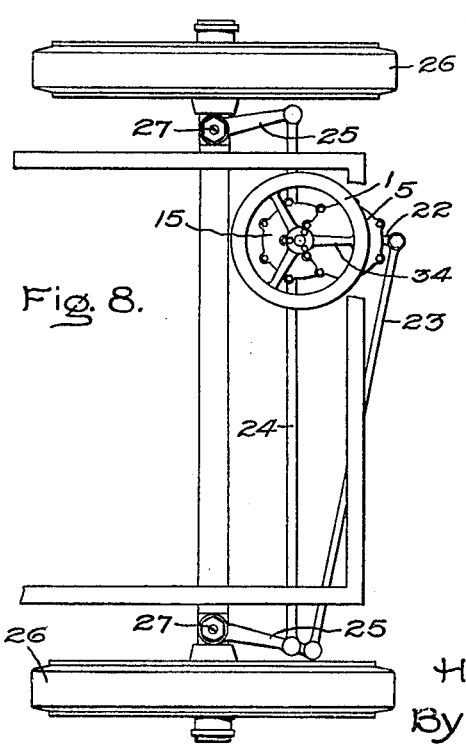

In the accompanying drawings, Figure 1 is a vertical section of a steering device and check of this description, taken on the line 1—1, Fig. 2; Fig. 2 is a sectional plan view on the line 2—2, Fig. 1; Fig. 3 is a fragmentary sectional view taken on the line 3—3, Fig. 1; Fig. 4 is a similar view on the line 4—4, Fig. 1; Fig. 5 is a vertical section, showing the valve closed; Fig. 6 is a similar view showing the valve open; Fig. 7 is a perspective view of the lower end portion of the valve; and Fig. 8 is a diagrammatic plan view illustrating the location of the steering wheel, check and levers relatively to the frame and guiding wheels.

The steering wheel is made in two parts, the upper part 1 being rigidly fastened to the steering post 2, while the lower part 3 is vertically movable with reference thereto. The steering post is tubular and passes through a stuffing box 4 rising from the gear casing 5, in which said post has a long bearing. At its lower end said post carries a pinion 6 which meshes with a spur gear 7 secured upon a shaft 8 whose upper end is journaled in a suitable bearing 9 in the casing. The pinion and gear are housed in a chamber 10 in the lower part of this portion of the casing, the chamber being higher than the width of the gear, so that the latter can rotate easily therein. Above the chamber 10 is a reservoir 11 covered by a removable lid 12. A small port 13 is made in the wall of this reservoir leading into the bearing of the post 2, and controlled by a check valve 14 opening toward said bearing, for a purpose afterward explained.

Below the gear casing 5, and preferably formed separate therefrom but secured thereto, is a second gear casing 15, and interposed between said casings is a valve chest 16. In the casing 15 is a spur gear 17 secured to a shaft 18 which has a long bearing in said casing and projects through a stuffing box 19 depending from the under side thereof. This gear meshes with a pinion 20 secured on the lower end of the shaft 18, which passes down through the valve chest and the lower casing and has a bearing 21 therein.

To the lower end of the shaft 18 is secured an arm 22, whose outer end is connected by links 23 and 24 with the wheel pivot arms 25, whereby the wheels 26 can be turned on their pivots 27.

The structure thus far described constitutes simply a train of reducing gearing between the steering wheel 1 and the finger 22. In order to produce a checking action, the lower casing is filled with some liquid, such as a heavy lubricant. The gear 17 has a close fit in its casing, so that it constitutes, with its pinion 20, a rotary pump tending to force the liquid from one side of the casing to the other when operated. In order to permit this to be done, the two sides of the casing are connected by a by-pass controlled by a valve. The by-pass is preferably composed of two passageways, one of which, 28, runs from one side of the casing to a valve chamber 29, while the other, 30, runs from the other side of said casing to the same valve chamber, entering it at a different level from the passageway 28. In the valve chamber is a valve 31, preferably cylindrical, and provided with a circumferential groove 32 which is connected by longitudinal holes 33 with the lower portion of the valve chamber. When the valve is raised so that the groove registers with the upper passageway 28, the two passageways are put into communication with each other through these holes 33, and the liquid can flow freely from one side of the casing to the other, so that the gears can be easily turned. This position of the valve is shown in Fig. 6. But when the valve is lowered, as shown in Fig. 1 and Fig. 5, it shuts the upper passageway and blocks the flow of liquid, so that the gears are thereby locked. The valve is operated by the lower portion 3 of the steering wheel, which has spokes 34 extending through slots in the tubular post 2 and connected to the upper end of a rod 35 passing down through said post and attached to the valve; said valve being preferably fitted to the inside of the lower portion of said post, which is in this event in line with the valve chamber.

In order to lubricate the upper gear and pinion the upper casing is filled with lubricant, and to make up for leakage, the reservoir 11 is also filled with lubricant. The check valve 14 permits the lubricant to flow from the reservoir when needed, but prevents the lubricant in the gear casings from backing up into the reservoir.

The operation of the device is as follows: When the steering wheel is grasped, preparatory to turning it, the two portions 1 and 3 of the rim are brought together, thus raising the valve and putting the two passageways into communication. As the wheel is turned, motion is transmitted to the steering arm 22, through the train of gearing, preferably at about a 7 to 1 reduction. As the gears 17 and pinion 20 rotate, they exert a pumping action which forces the lubricant through the passageways 28 and 30 from one side of the casing to the other, the lubricant flowing through the groove 32 and the holes 33 in the valve. When, however, the steering wheel is released and the valve returns to the position shown in Figs. 1 and 5 by a spring or gravity, or both, it is obvious that the circulation of the lubricant will be stopped, and hence further movement of the gears and of the guiding wheels of the vehicle is checked.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. The combination with a rotatable steering wheel, of a guiding wheel, a train of reducing gears between the wheels, certain of which act as a rotary pump, a by-pass connecting the two sides of the pump, and a valve for controlling said by-pass.

2. The combination with a rotatable steering wheel, of a wheel moved thereby, gearing between the wheels which in addition to transmitting motion also forms a part of a rotary pump, a by-pass connecting the two sides of the pump, a valve for controlling said by-pass, and means for operating said valve located adjacent to said steering wheel.

3. The combination with a rotatable steering wheel, of two intermeshing gears driven thereby, a casing inclosing said gears, a by-pass from one side of the casing to the other, and means for controlling said by-pass.

4. The combination with a steering wheel, of a train of gears driven thereby, a casing inclosing the portion of said train closely, a by-pass between the opposite sides of said casing, means for controlling said by-pass, and a filling of liquid for said casing.

5. The combination with a tubular steering post, of a train of gears driven thereby, two of which gears constitute a rotary pump, a by-pass from one side of said pump to the other, a valve controlling said by-pass, and a valve rod inclosed in said post.

6. The combination with a tubular steering post, of a train of gears driven thereby, two of which constitute a rotary pump, a by-pass from one side of the pump to the other, a valve chamber in line with said post, a valve in said chamber controlling said by-pass, and a valve rod extending through said post.

7. The combination with a steering post, of two casings, a gear in each casing, one turning loosely therein and the other having a close fit, a pinion on the post meshing with the first gear, and a pinion on the shaft of said gear meshing with the second gear, a by-pass around the second gear and its pinion, a valve controlling said by-pass, and a reservoir of lubricant for said casings.

8. The combination with a tubular steering post, of two superposed casings, a reservoir above the upper casing, a valved port from said reservoir to the bearing of said post, a train of gears in said casings, a valve chest between said casings, a by-pass in said chest around a portion of said gears, a valve controlling said by-pass and fitting in said post, and a valve rod extending through said post.

9. The combination of a driving and a driven member, a power multiplying connection between the members that also forms a part of a lock, a casing that contains the connection and coöperates therewith to form the remainder of the lock to prevent relative movements of the said members, and a means actuated from a point outside of the casing for controlling the action of the lock.

10. The combination of a driving and a driven member, a mechanical power-multiplying connection between the members, a hydraulic locking means partially formed by one portion only of the said connection, and a positively-actuated valve for controlling the action of the hydraulic locking means.

11. The combination of a driving and a driven member, gearing between the members acting as a power-multiplying connection, a fluid-containing casing for one portion of the gears, the walls of which make a close fit with said gears, and a valve which controls the passage of fluid in the casing from one side of the gears to the other.

12. The combination of a driving and a driven member, a double set of spur-gears forming a power-multiplying connection between said members, one set of gears also acting as a pump, a close fitting casing for one pair of gears which contains a body of non-compressible fluid, a by-pass for shunting the fluid from one side of the gears to the other, and a positively-actuated valve for controlling the flow of fluid in said by-pass.

13. The combination of a driving and a driven member, a power multiplying connection between the members that includes gear wheels, said wheels also forming a part of a lock to prevent relative movements of the said members, a means coöperating with said gears to form the remainder of the lock, and a means for controlling the action of the lock.

In witness whereof, I have hereunto set my hand this sixth day of March, 1907.

HERMANN LEMP.

Witnesses:
   JOHN A. McMANUS, Jr.
   PHILIP F. HARRINGTON.